US009502043B2

(12) United States Patent
Oh et al.

(10) Patent No.: US 9,502,043 B2
(45) Date of Patent: *Nov. 22, 2016

(54) METHOD AND AN APPARATUS FOR PROCESSING AN AUDIO SIGNAL

(71) Applicant: LG ELECTRONICS INC., Seoul (KR)

(72) Inventors: Hyen O Oh, Seoul (KR); Yang Won Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 286 days.

This patent is subject to a terminal disclaimer.

(21) Appl. No.: 14/178,096

(22) Filed: Feb. 11, 2014

(65) Prior Publication Data

US 2014/0177848 A1 Jun. 26, 2014

Related U.S. Application Data

(63) Continuation of application No. 12/632,334, filed on Dec. 7, 2009, now Pat. No. 8,670,575.

(60) Provisional application No. 61/120,057, filed on Dec. 5, 2008.

(30) Foreign Application Priority Data

Dec. 4, 2009 (KR) ........................ 10-2009-0119980

(51) Int. Cl.
*H04B 1/00* (2006.01)
*G10L 19/008* (2013.01)
*G10L 19/20* (2013.01)

(52) U.S. Cl.
CPC ............. *G10L 19/008* (2013.01); *G10L 19/20* (2013.01); *H04S 2400/03* (2013.01); *H04S 2400/09* (2013.01); *H04S 2420/03* (2013.01)

(58) Field of Classification Search
CPC . G10L 19/008; G10L 19/20; H04S 2420/03; H04S 2400/09; H04S 2400/03
USPC ......... 381/27, 22, 23, 21, 20, 19, 18, 2, 119, 381/104; 369/4, 1; 700/94
See application file for complete search history.

(56) References Cited

U.S. PATENT DOCUMENTS 5,719,344 A 2/1998 Pawate
2008/0205670 A1 8/2008 Oh et al.
2011/0022402 A1 1/2011 Engdegard et al.

FOREIGN PATENT DOCUMENTS

WO WO 2008/046530 A2 4/2008
WO WO 2008/046531 A1 4/2008

(Continued)

OTHER PUBLICATIONS

Audio Subgroup, "Call for Proposals on Spatial Audio Object Coding," International Organisation for Standardisation, ISO/IEC JTC1/SC29/WG11, MPEG2007/N8853, Jan. 2007, 5 pages.

(Continued)

*Primary Examiner* — Vivian Chin
*Assistant Examiner* — Con P Tran
(74) *Attorney, Agent, or Firm* — Birch, Stewart, Kolasch & Birch, LLP

(57) ABSTRACT

A method for processing an audio signal at an audio decoder, the method including receiving a downmix signal, a residual signal, and object information; extracting a background-object signal and a foreground-object signal from the downmix signal using the residual signal and object information; receiving mix information including gain information for the background-object signal; generating a downmix processing information based on the object information and the mix information; and generating an output signal including a modified background-object signal and a modified foreground-object signal. The modified background-object signal is obtained by modifying a gain of the background-object signal using the mix information. The modified foreground-object signal is obtained by modifying a gain of the foreground-object signal using the downmix processing information.

8 Claims, 15 Drawing Sheets

200

(56) References Cited

FOREIGN PATENT DOCUMENTS

| | | | |
|---|---|---|---|
| WO | WO 2008/063034 | A1 | 5/2008 |
| WO | WO 2008/063035 | A1 | 5/2008 |
| WO | WO 2008/114985 | A1 | 9/2008 |
| WO | WO 2008-120933 | A1 | 10/2008 |
| WO | WO 2009/049895 | A1 | 4/2009 |

OTHER PUBLICATIONS

Engdegord et al. "Spatial Audio Object Coding (SAOC) the Upcoming MPEG Standard on Parametric Object Based Audio Coding", Audio Engineering Society, 124th AES Convention, XP002541458, Paper 7377, pp. 1-15, May 17, 2008.

5-1-5$_1$ tree structure 5-1-$5_2$ tree structure 5-2-5 tree structure

200C

200D

METHOD AND AN APPARATUS FOR PROCESSING AN AUDIO SIGNAL

CROSS-REFERENCE TO RELATED APPLICATIONS

This application is a continuation of co-pending U.S. patent application Ser. No. 12/632,334 fled on Dec. 7, 2009, which claims the benefit of U.S. Provisional Application No. 61/120,057 filed on Dec. 5, 2008, and Korean patent application No. 10-2009-0119980 filed on Dec. 4, 2009, the entire contents of all of the above applications are hereby incorporated by reference.

BACKGROUND OF THE INVENTION

1. Field of the Invention

The present invention relates to an apparatus for processing an audio signal and method thereof. Although the present invention is suitable for a wide scope of applications, it is particularly suitable for encoding or decoding an audio signal.

2. Discussion of the Related Art

Generally, in the process for downmixing a plurality of objects into a mono or stereo signal, parameters are extracted from the object signals, respectively. These parameters are usable for a decoder. And, panning and gain of each of the objects is controllable by a selection made by a user.

However, in order to control each object signal, each source contained in a downmix should be appropriately positioned or panned.

Moreover, in order to provide downlink compatibility according to a channel-oriented decoding scheme, an object parameter should be converted to a multi-channel parameter for upmixing.

SUMMARY OF THE INVENTION

Accordingly, the present invention is directed to an apparatus for processing an audio signal and method thereof that substantially obviate one or more of the problems due to limitations and disadvantages of the related art.

An object of the present invention is to provide an apparatus for processing an audio signal and method thereof, by which a mono signal, a stereo signal and a stereo signal can be outputted by controlling gain and panning of an object.

Another object of the present invention is to provide an apparatus for processing an audio signal and method thereof, by which distortion of a sound quality can be prevented in case of adjusting a gain of a vocal or background music with a considerable width.

A further object of the present invention is to provide an apparatus for processing an audio signal and method thereof, by which a gain of background music can be adjusted in case of outputting a mono or stereo signal without using a multi-channel decoder.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, To achieve these and other advantages and in accordance with the purpose of the present invention, as embodied and broadly described, a method for processing an audio signal, comprising: receiving a downmix signal, a residual signal and object information; extracting at least one of a background-object signal and a foreground-object signal from the downmix signal using the residual signal; receiving mix information comprising gain control information for the background-object signal; generating a downmix processing information based on the object information and the mix information; and, generating a processed downmix signal comprising a modified background-object signal to which an adjusted gain corresponding to the gain control information is applied, by applying the downmix processing information to the at least one of the background-object signal and the foreground-object signal is provided.

According to the present invention, the at least one of the background-object signal and the foreground-object signal are extracted further using the object information.

According to the present invention, the background-object signal corresponds to one of a mono signal and a stereo signal.

According to the present invention, the processed downmix signal corresponds to a time-domain signal.

According to the present invention, the method further comprises generating multi-channel information using the object information and the mix information; and, generating a multi-channel signal using the multi-channel information and the processed downmix signal.

To further achieve these and other advantages and in accordance with the purpose of the present invention, an apparatus for processing an audio signal, comprising: a multiplexer receiving a downmix signal, a residual signal and object information; an extracting unit extracting at least one of a background-object signal and a foreground-object signal from the downmix signal using the residual signal; an information generating unit receiving mix information comprising gain control information for the background-object signal, and generating a downmix processing information based on the object information and mix information; and, a rendering unit generating a processed downmix signal comprising a modified background-object signal to which an adjusted gain corresponding to the gain control information is applied, by applying the downmix processing information to the at least one of the background-object signal and the foreground-object signal, wherein, when the mix information comprises gain control information for the background-object signal, the processed downmix signal comprises a modified background-object signal to which an adjusted gain corresponding to the gain control information is applied is provided.

According to the present invention, the at least one of the background-object signal and the foreground-object signal are extracted further using the object information.

According to the present invention, the background-object signal corresponds to one of a mono signal and a stereo signal.

According to the present invention, the processed downmix signal corresponds to a time-domain signal.

According to the present invention, the apparatus further comprises a multichannel decoder generating a multi-channel signal using multi-channel information and the processed downmix signal, wherein the information generating unit generates the multi-channel information using the object information and the mix information.

To further achieve these and other advantages and in accordance with the purpose of the present invention, a computer-readable medium having instructions stored thereon, which, when executed by a processor, causes the processor to perform operations, comprising: receiving a downmix signal, a residual signal and object information; extracting at least one of a background-object signal and a foreground-object signal from the downmix signal using the residual signal; generating a downmix processing information based on the object information and mix information; and, generating a processed downmix signal by applying the downmix processing information to the at least one of the background-object signal and the foreground-object signal, wherein, when the mix information comprises gain control information for the background-object signal, the processed downmix signal comprises a modified background-object signal to which an adjusted gain corresponding to the gain control information is applied is provided.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings. First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way. The embodiment disclosed in this disclosure and configurations shown in the accompanying drawings are just one preferred embodiment and do not represent all technical idea of the present invention. Therefore, it is understood that the present invention covers the modifications and variations of this invention provided they come within the scope of the appended claims and their equivalents at the timing point of filing this application.

According to the present invention, terminologies not disclosed in this specification can be construed as the following meanings and concepts matching the technical idea of the present invention. Specifically, 'information' in this disclosure is the terminology that generally includes values, parameters, coefficients, elements and the like and its meaning can be construed as different occasionally, by which the present invention is non-limited.

Figure 1A:
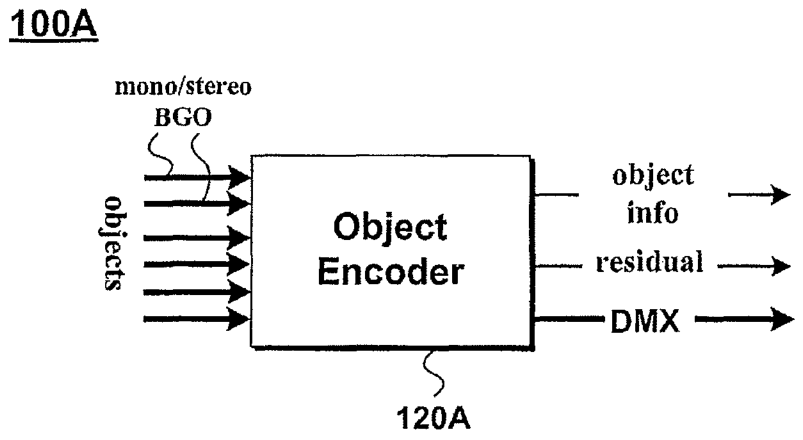
FIGS. 1(A) and 1(B) are block diagrams of an encoder of an audio signal processing apparatus according to an embodiment of the present invention.
Figure 1B:
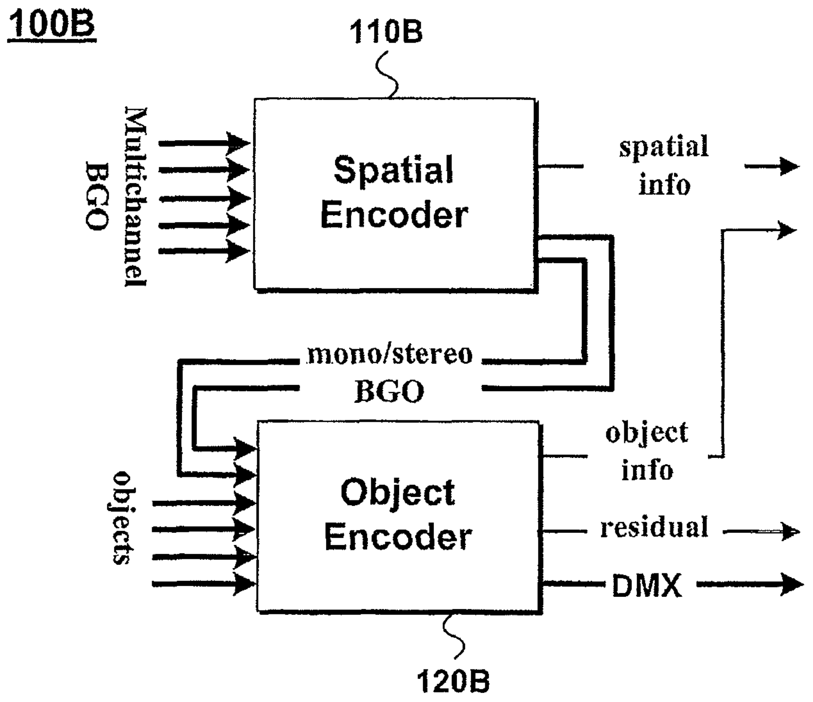

FIGS. 1(A) and 1(B) (Collectively FIG. 1) are block diagrams of an encoder of an audio signal processing apparatus according to an embodiment of the present invention. FIG. 1 (A) shows a case that a background object (BGO) is a mono or stereo signal. And, FIG. 1 (B) shows a case that a background object (BGO) is a multi-channel signal.

Referring to FIG. 1 (A), a decoder 100A includes an object encoder 120A. The object encoder 120A generates a downmix signal DMX by downmixing a background object BGO and at least one foreground object on a mono or stereo channel by an object based scheme. And, the object encoder 120A generates object information and residual in the course of the downmixing.

In this case, the background object BGO is background music containing plural source signals (e.g., musical instrument signals) or the like. And, the background object BGO can be configured with several instrument signals in case of attempting to simultaneously control several instrument sounds rather than control each instrument signal individually. Meanwhile, in case that a background object BGO is a mono signal, the corresponding mono signal becomes one object. If a background object BGO is a stereo signal, a left channel signal and a right channel signal becomes objects, respectively. Hence, there are total two object signals.

On the contrary, a foregoing object FGO corresponds to one source signal and may correspond to at least one vocal signal for example. The foreground object FGO corresponds to a general object signal controlled by an object based encoder/decoder.

In case that a level of a foreground object FGO is adjusted into '0', as a background object BGO is played back only, it is able to implement a karaoke mode. On the contrary, if a level of a background object BGO is lowered into '0', as a foreground object (FGO) is played back only, it is able to implement a solo mode. In case that at least two foreground objects exist, it is able to implement a cappella mode.

As mentioned in the foregoing description, the object encoder 120A generates a downmix DMX by downmixing an object including a background object BGO and a foreground object FGO and also generates object information in the course of the downmixing. In this case, object information (OI) is the information on objects included in a downmix signal and is the information required for generating a plurality of object signals from a downmix signal DMX. Object information can include object level information, object correlation information and the like, by which the present invention is non-limited.

Meanwhile, in the downmixing process, the object encoder 120A is able to generate a residual signal corresponding to information on a difference between a background object BGO and a foreground object FGO. In particular, the object encoder 120A can include an NTO module 1220-1 or an NTT module 122-2, which will be described with reference to FIG. 2 later.

Referring to FIG. 1 (B), if a background object BGO is a multi-channel signal, an encoder 100E further includes a spatial encoder 110B. The spatial encoder 110B generates a mono or stereo downmix by downmixing a multi-channel background object MBO by a channel based scheme. The spatial encoder 110B extracts spatial information in this downmixing process. In this case, spatial information is the information for upmixing a downmix DMX into multi-channel signal and can include channel level information, channel correlation information and the like.

Thus, the spatial encoder 110B generates a mono- or stereo-channel downmix and spatial information. The spatial information is delivered to a decoder by being carried on a bit stream. And, the mono or stereo downmix is inputted as one or two objects to an object encoder 120B. The object encoder 120B can have the same configuration of the former object encoder 120A shown in FIG. 1 (A) and its details are omitted from the following description.

Figure 2A:
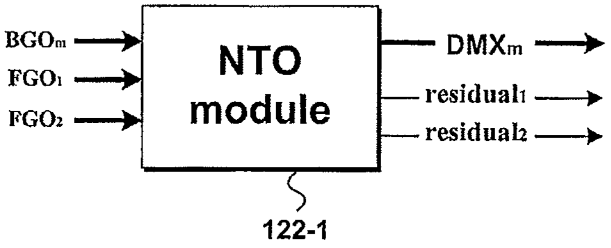
FIGS. 2(A) and 2(B) are block diagrams of an NTT/NTO module included in an object encoder 120A/120B.
Figure 2B:
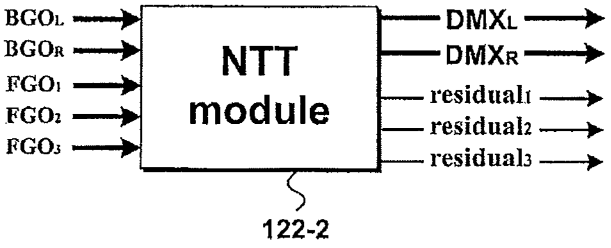

FIGS. 2(A) and 2(B) show examples of an NTO module 122-1 and an NTT module 122-2.

Referring to FIG. 2 (A), an NTO (N-To-One) module 122-1 generates a mono downmix $DMX_m$ by downmixing BGO ($BGO_m$) and two FGOs ($FGO_1$, $FGO_2$) on a mono channel and also generates two residual signals $residual_1$ and $residual_2$. For instance, two vocals can exist in mono-channel background music. Since the background object is a mono signal, a downmix signal can correspond to a mono signal as well. Meanwhile, the first residual $residual_1$ can include a signal determined when a first temporary downmix is generated from combining the first FGO $FGO_1$ with the mono background object $BGO_m$, by which the present invention is non-limited. And, the second residual $residual_2$ can include a signal extracted when a last downmix $DMX_m$ is generated from downmixing the second FGO $FGO_2$ with the first temporary downmix, by which the present invention is non-limited.

Referring to FIG. 2 (B), an NTT (N-To-Two) module 122-2 generates stereo downmix $DMX_L$ and $DMX_R$ by downmixing BGO ($BGO_L$ and $BGO_R$) and 3 FGOs of a stereo signal and also extracts first to third residuals $residual_1$ to $residual_3$ in this downmixing process. IN this case, since the BGO corresponds to a stereo channel, the downmix signal can correspond to a stereo channel as well. Like the case of the NTO module 122-1, the first residual $residual_1$ can include a signal determined when a first temporary downmix is generated from combining the first FGO $FGO_1$ with the stereo background objects $BGO_L$ and $BGO_R$, by which the present invention is non-limited. And, the second residual $residual_2$ can include a signal determined when a second temporary downmix is generated from combining the second FGO $FGO_2$ with the first temporary downmix, by which the present invention is non-limited. Moreover, the third residual $residual_3$ can include a signal extracted when last downmix $BGO_L$ and $BGO_R$ is generated from combining the third FGO $FGO_3$ with the second temporary downmix, by which the present invention is non-limited.

Figure 3:
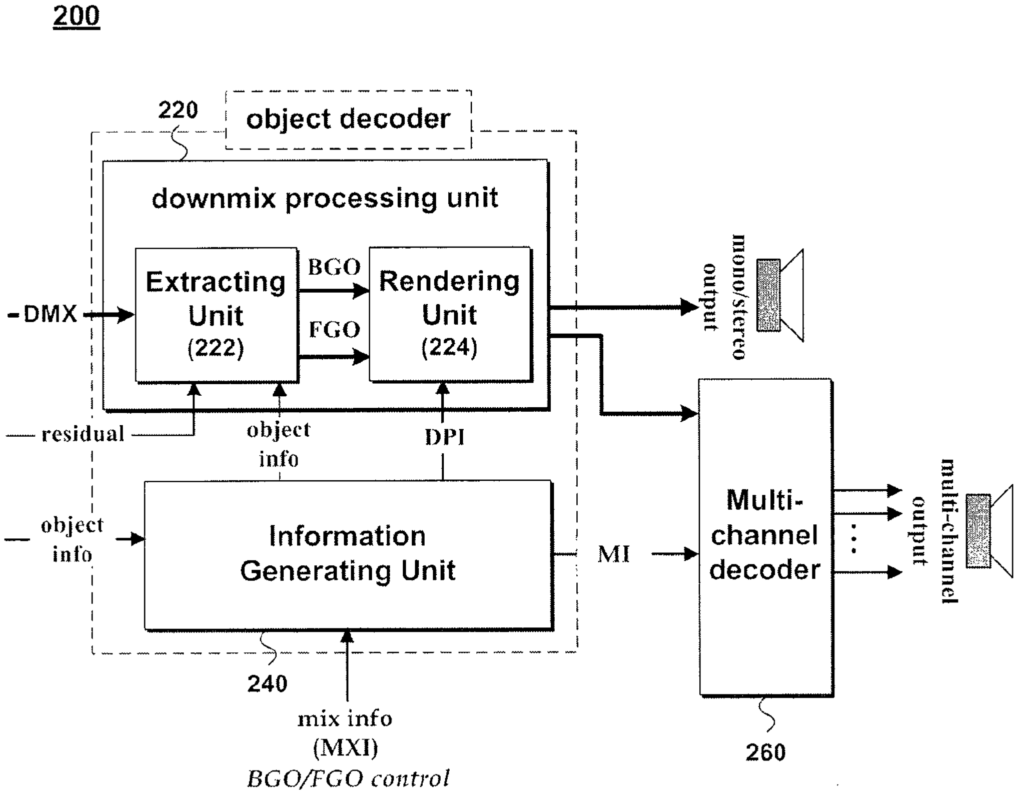
FIG. 3 is a block diagram of a decoder of an audio signal processing apparatus according to an embodiment of the present invention.
Figure 4:
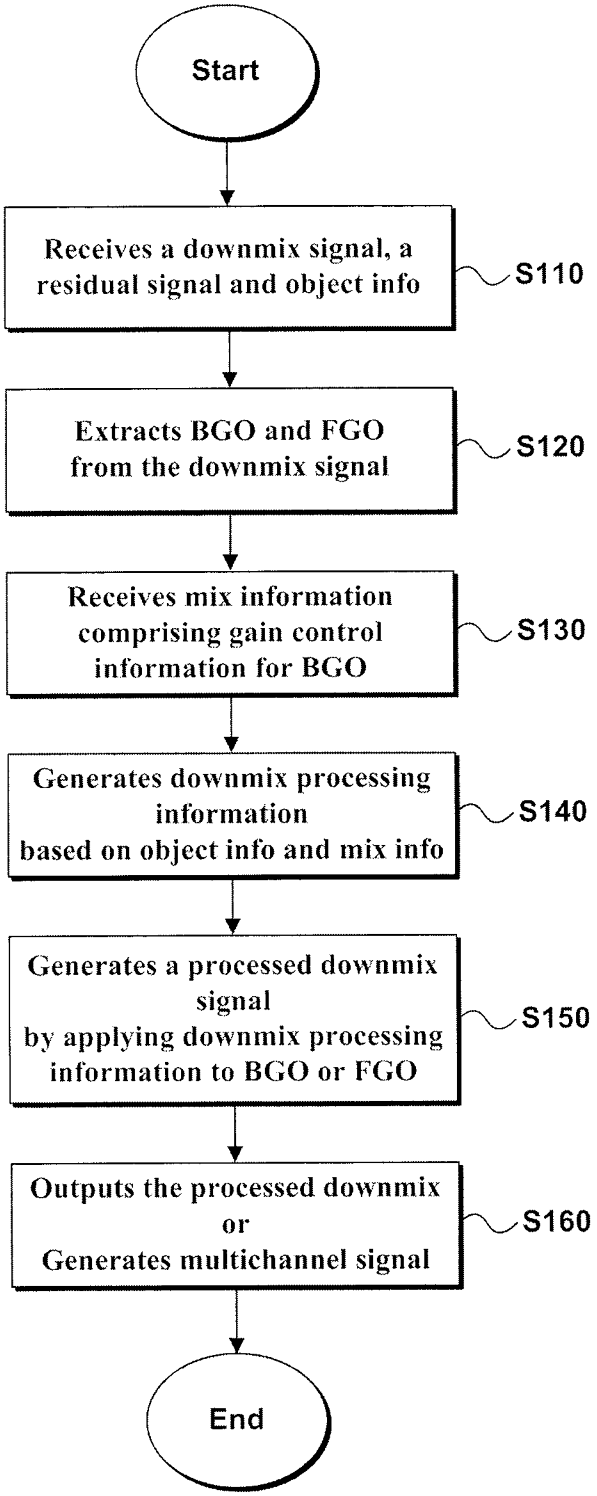
FIG. 4 is a flowchart for an audio signal processing method according to an embodiment of the present invention.

FIG. 3 is a block diagram of a decoder of an audio signal processing apparatus according to an embodiment of the present invention, and FIG. 4 is a flowchart for an audio signal processing method according to an embodiment of the present invention.

Referring to FIG. 3, a decoder includes a downmix processing unit 220 and an information generating unit 240 and can further include a multiplexer (not shown in the drawing) and a multi-channel decoder 260. Besides, the downmixing processing unit 220 is able to include an extracting unit 222 and a rendering unit 224.

Referring to FIG. 3 and FIG. 4, the multiplexer (not shown in the drawings) receives a downmix signal, a residual signal and object information via a bit stream [S110]. In this case, the downmix signal can correspond to a signal generated from downmixing a background object (BGO) and at least one foreground object (FGO) by the method described with reference FIG. 1 and FIG. 2. The residual signal can correspond to the former residual signal described with reference to FIG. 1 and FIG. 2. As the object information may be the same as described with reference to FIG. 1, its details are omitted from the following description.

The extracting unit 222 extracts a background object BGO and at least one foreground object FGO from a downmix signal DMX [S120]. As mentioned in the foregoing description, the downmix signal DMX can correspond to a mono or stereo channel and the background object BGO can correspond to the mono or stereo signal. The extracting unit 222 can include an OTN (One-To-N) module or a TTN (Two-To-N) module, of which configuration is explained with reference to FIG. 5 as follows.

Figure 5A:
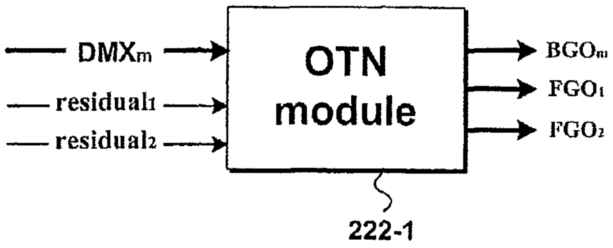
FIGS. 5(A) and 5(B) are block diagrams of an OTN/TTN module included in an extracting unit 220.
Figure 5B:
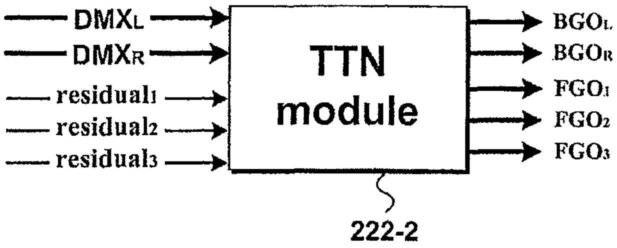

FIGS. 5(A) and 5(B) are block diagrams of an OTN/TTN module included in the extracting unit 220.

Referring to FIGS. 5(A) and 5(B), an OTN module 222-1 extracts at least one FGO from a mono downmix $DMX_m$. And, a TTN module 222-2 extracts at least one FGO from stereo downmix $DMX_L$, and $DMX_R$. The OTN module 222-1 can perform a process inverse to that of the former NTO module 122-1 described with reference to FIG. 2. And, the TTN module 222-2 can perform a process inverse to that of the former NTT module 122-2 described with reference to FIG. 2. Therefore, details of the OTN and OTT modules are omitted from the following description.

Referring now to FIG. 3 and FIG. 4, the extracting unit 222 is able to further use the object information to extract a background object and at least one foreground object from the mono or stereo downmix DMX. This object information can be obtained in a manner of being directly parsed by the extracting unit 222 or being delivered from the information generating unit 240, by which the present invention is non-limited.

Meanwhile, the information generating unit 240 receives mix information MXI [S130]. In this case, the mix information MXI can include gain control information on BGO. The mix information (MXI) is the information generated based on object position information, object gain information, playback configuration information and the like. The object position information and the object gain information are the information for controlling an object included in a downmix. In this case, the object includes the concept of the above described background object BGO as well as the above described foreground object FGO.

In particular, the object position information is the information inputted by a user to control a position or panning of each object. The object gain information is the information inputted by a user to control a gain of each object. Therefore, the object gain information can include gain control information on BGO as well as gain control information on FGO.

Meanwhile, the object position information or the object gain information may be the one selected from preset modes. In this case, the preset mode is the value for presetting a specific gain or position of an object. The preset mode information can be a value received from another device or a value stored in a device. Meanwhile, selecting one from at least one or more preset modes (e.g., preset mode not in use, preset mode 1, preset mode 2, etc.) can be determined by a user input.

The playback configuration information is the information containing the number of speakers, a position of speaker, ambient information (virtual position of speaker) and the like. The playback configuration information can be inputted by a user, can be stored in advance, or can be received from another device.

Moreover, the information generating unit 220 is able to receive output mode information (OM) as well as the mix information MXI. The output mode information (OM) is the information on an output mode. For instance, the output mode information (OM) can include the information indicating how many signals are used for output. This information indicating how many signals are used for output can correspond to one information selected from the group consisting of a mono output mode, a stereo output mode and a multi-channel output mode. Meanwhile, the output mode information (OM) may be identical to the number of speakers of the mix information (MXI). If the output mode information (OM) is stored in advance, it is based on device information. If the output mode information (OM) is inputted by a user, it is based on user input information. In this case, the user input information can be included in the mix information (MXI).

The information generating unit 240 generates downmix processing information based on the object information received in the step S110 and the mix information received in the step S130 [S140]. The mix information can include gain control information on BGO as well as gain and/or position information on FGO. For instance, in case of a karaoke mode, a gain for FGO is adjusted into 0 and a gain control for BGO can be adjusted into a predetermined range. On the contrary, in case of a solo mode or a cappella mode, a gain for BGO is adjusted into 0 and a gain and/or position for at least one FGO can be controlled.

The rendering unit 224 generates a processed downmix signal by applying the downmix processing information generated in the step S140 to at least one of the background object BGO and at least one foreground object FGO [S150].

Subsequently, if the output mode (OM) is a mono or stereo output mode, the rendering unit 224 generates and outputs a processed downmix signal of a time-domain signal [S160]. If the output mode (OM) is a multi-channel output mode, the information generating unit 240 generates multi-channel information (MI) based on the object information and the mix information (MXI). In this case, the multi-channel information (MI) is the information for upmixing a downmix (DMX) into a multi-channel signal and is able to include channel level information, channel correlation information and the like.

If the multi-channel information (MI) is generated, the multi-channel decoder generates a multi-channel output signal using the downmix (DMX) and the multi-channel information (MI) [S160].

Figure 6:
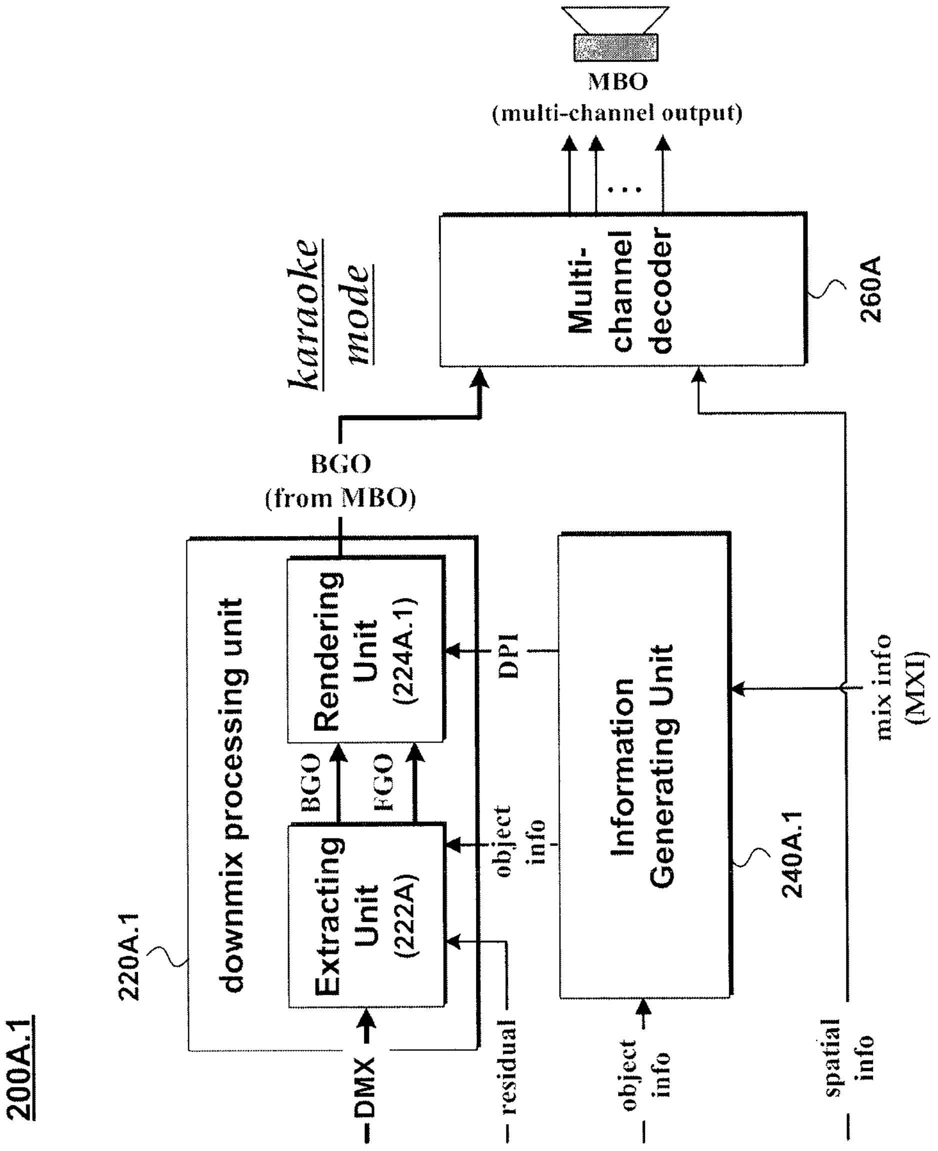
FIG. 6 and FIG. 7 are block diagrams for first and second examples of a decoder for extracting a multi-channel background object (MBO) signal in case of a karaoke mode, respectively.
Figure 7:
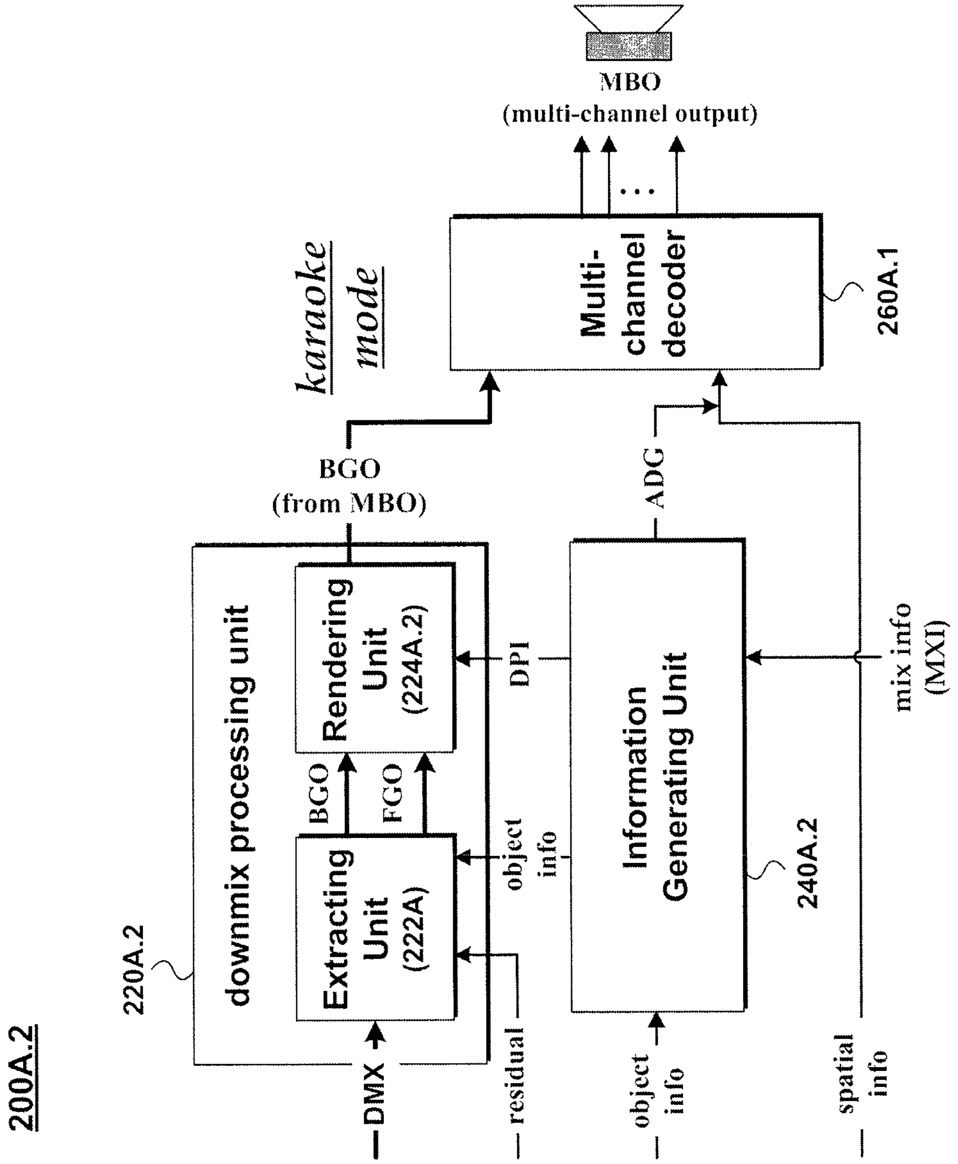

FIG. 6 and FIG. 7 are block diagrams for first and second examples of a decoder for extracting a multi-channel background object (MBO) signal in case of a karaoke mode, respectively.

Referring to FIG. 6, a decoder 200A.1 includes the elements having the same names of the elements of the former decoder 200 described with reference to FIG. 3 and performs functions similar to those of the former decoder 200 shown in FIG. 3. In the following description, the elements performing functions different from those of the former decoder 200 shown in FIG. 3 shall be explained.

First of all, like the former extracting unit 222 described with reference to FIG. 3, an extracting unit 222A extracts a background object and at least one foreground object from a downmix. In this case, if the background object corresponds to a multi-channel background object (MBO), a multiplexer (not shown in the drawing) receives spatial information. In this case, the spatial information is the information for upmixing a downmixed background object into a multi-channel signal and may be identical to the former spatial information generated by the spatial encoder 1210B shown in FIG. 1 (B).

If the background object BGO corresponds to a signal downmixed from the multi-channel background object MBO and a karaoke mode is selected according to the mix information MXI (i.e., if a gain for FGO is adjusted into 0), a multi-channel decoder 240A is able to use the received spatial information as it is rather than an information generating unit 230A.1 generates multi-channel information (MI). This is because this spatial information is the information generated when mono/stereo BGO is generated from MBO.

In doing so, before the BGO extracted by the multi-channel decoder 260A is inputted to the multi-channel decoder 260A, it is able to perform a control for raising or lowering a gain of the BGO overall. Information on this control is included in the mix information (MXI). This mix information (MXI) is then reflected on the downmix processing information (DPI). Therefore, before the BGO is upmixed into a multi-channel signal, the corresponding gain can be adjusted.

Like the case shown in FIG. 6, FIG. 7 shows a case that BGO is downmixed from MBO and a case that a gain of BGO is adjusted before the BGO is upmixed into MBO. The former decoder 220A.1 shown in FIG. 6 reflects this control on the downmixing processing information. On the contrary, a decoder 220A.2 shown in FIG. 7 transforms this control into an arbitrary downmix gain (ADG) and then enables it to be included in spatial information inputted to a multi-channel decoder 260A.1. In this case, the arbitrary downmix gain is the factor for adjusting a gain for a downmix signal in a multi-channel decoder. And, the arbitrary downmix gain is the gain applied to a downmix signal prior to being upmixed into a multi-channel signal, i.e., mono or stereo BGO only. Thus, it is able to adjust a gain for mono or stereo BGO using an arbitrary downmix gain.

Figure 8:
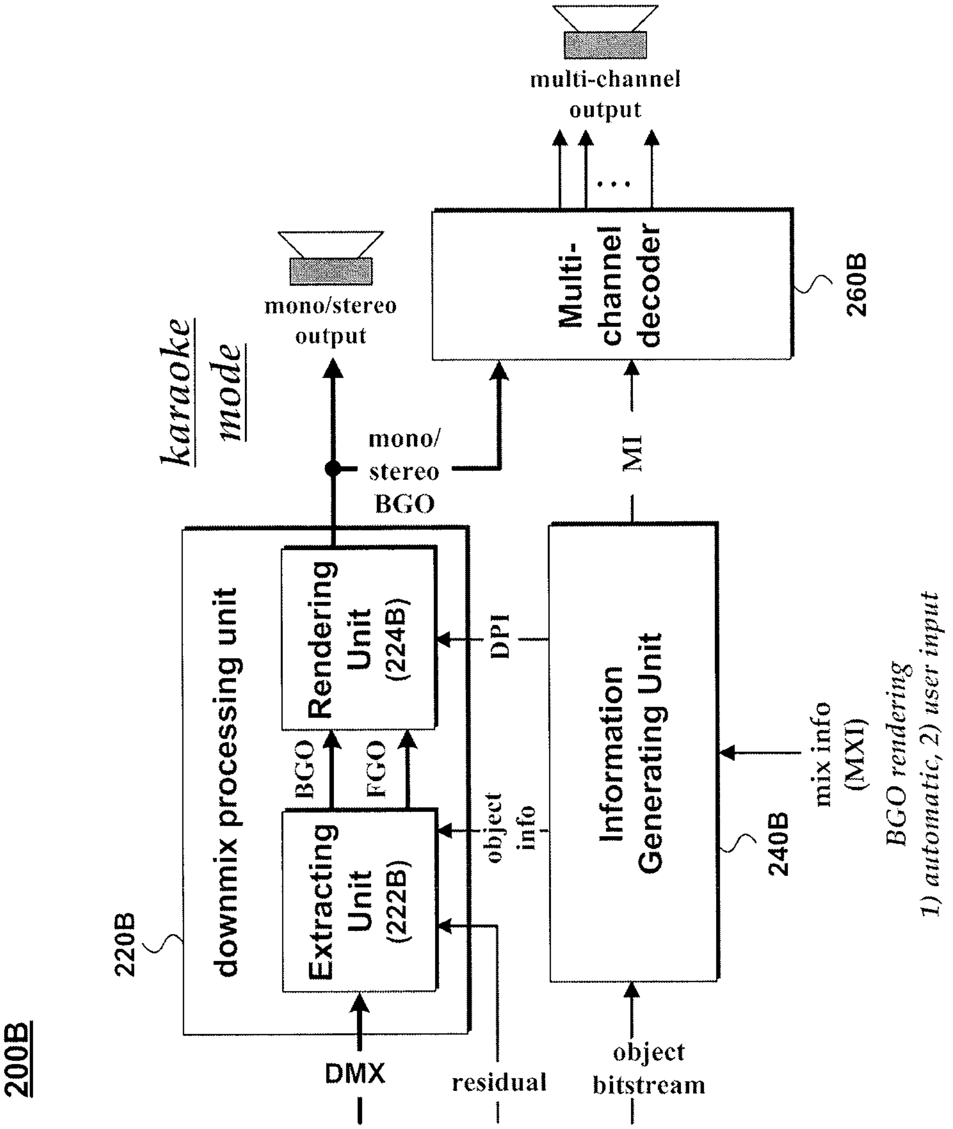
FIG. 8 is a block diagram for an example of a decoder for extracting a mono/stereo background object (BGO) signal in case of a karaoke mode.

FIG. 8 is a block diagram for an example of a decoder for extracting a mono/stereo background object (BGO) signal in case of a karaoke mode.

Referring to FIG. 8, like the cases shown in FIG. 6 and FIG. 7, a decoder 200B includes the elements having the same names of the elements of the former decoder 200 described with reference to FIG. 3 and mostly performs functions similar to those of the former decoder 200 shown in FIG. 3. In the following description, the differences in-between are explained only.

First of all, unlike the case shown in FIG. 6 or FIG. 7, since a background object BGO is not a multi-channel background object MBO, a decoder 200B does not have spatial information received from an encoder. Accordingly, a mono/stereo background object BGO is not inputted to a multi-channel decoder 260B but can be outputted as a time-domain signal from a downmix processing unit 220B. As a user has multi-channel speakers (e.g., 5.1 channels, etc.), if BGO is inputted to the multi-channel decoder 260B, it may need to be mapped by a center channel or left and right channels of the 5.1 channels or the like. Moreover, it may occur that a user attempts to map mono BGO by the same level for the left or right channel. Automatic BGO rendering according to an output mode and BGO rendering according to user's intention are described in detail as follows.

Automatic BGO Rendering According to an Output Mode

First of all, in case that the number of channels of mono or stereo BGO matches the number of channels of an output mode, the decoder 200B does not need an additional process. For instance, if BGO is a mono signal and an output mode ((OM) of the decoder is mono, the rendering unit 224B outputs a time-domain mono signal. If the BGO is a stereo signal and an output mode (OM) of the decoder is stereo, the rendering unit 224B outputs a time-domain mono signal as well.

Yet, if the number of channels of BGO corresponds to mono or stereo and an output mode is a signal having at least 3 channels such as 5.1 channels and the like, the multi-channel decoder 260B should be activated. In particular, in order to properly map the mono or stereo BGO by a multi-channel, the information generating unit 240B generates multi-channel information (MI). For instance, in case of mono BGO, the mono BGO can be mapped by a center channel (C) of a multi-channel. In case of stereo BGO, the stereo BGO can be rendered into left and right channels L and R of the multi-channel, respectively. In order to perform this rendering, spatial parameters corresponding to various tree structures should be generated from the multi-channel information (MI). And, the corresponding details will be explained with reference to FIG. 9, FIG. 10 and FIG. 11 as follows.

Figure 9:
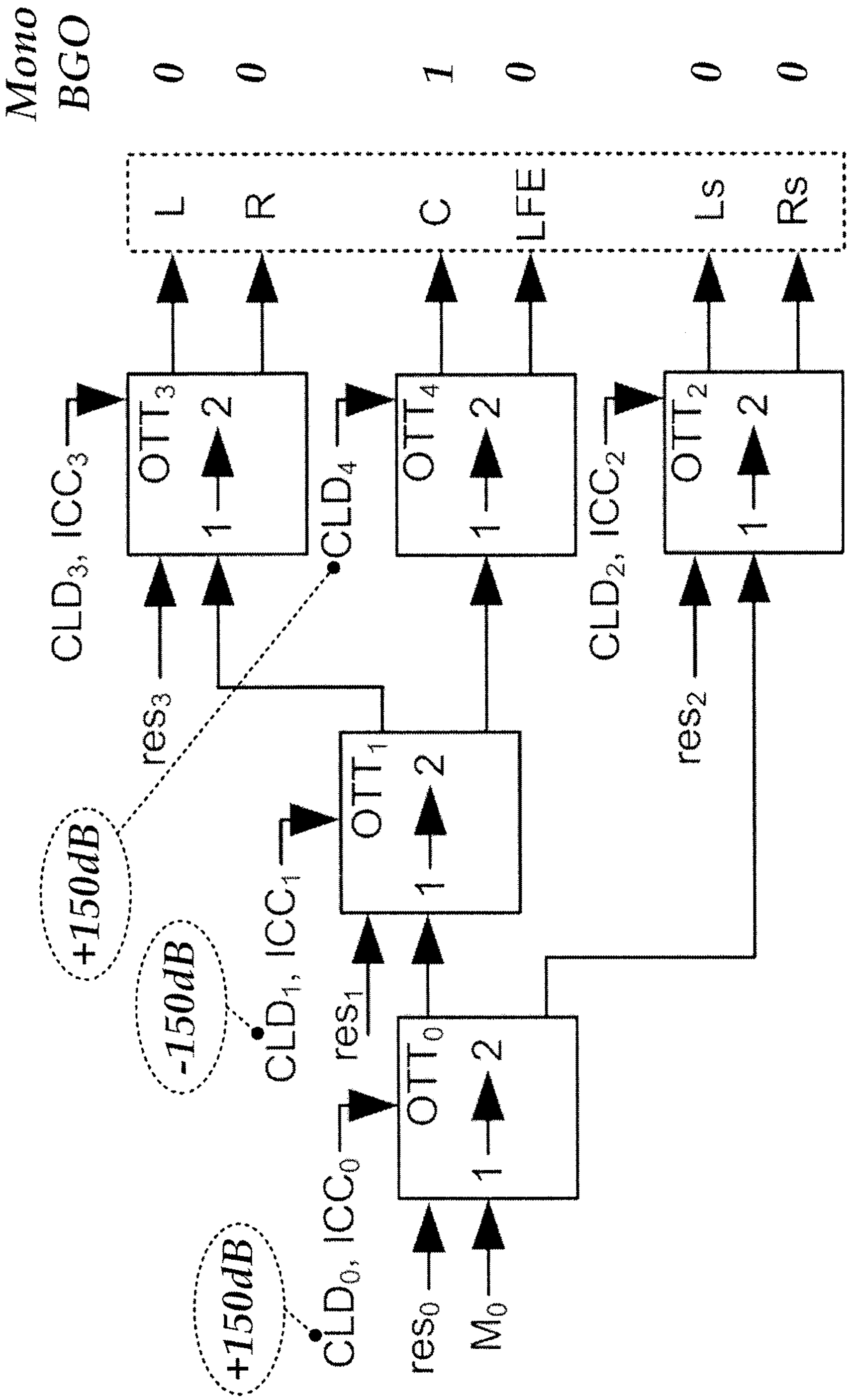
FIG. 9 is a diagram for explaining a concept of outputting a mono background object (BGO) signal based on 5-1-$5_1$ tree structure.
Figure 10:
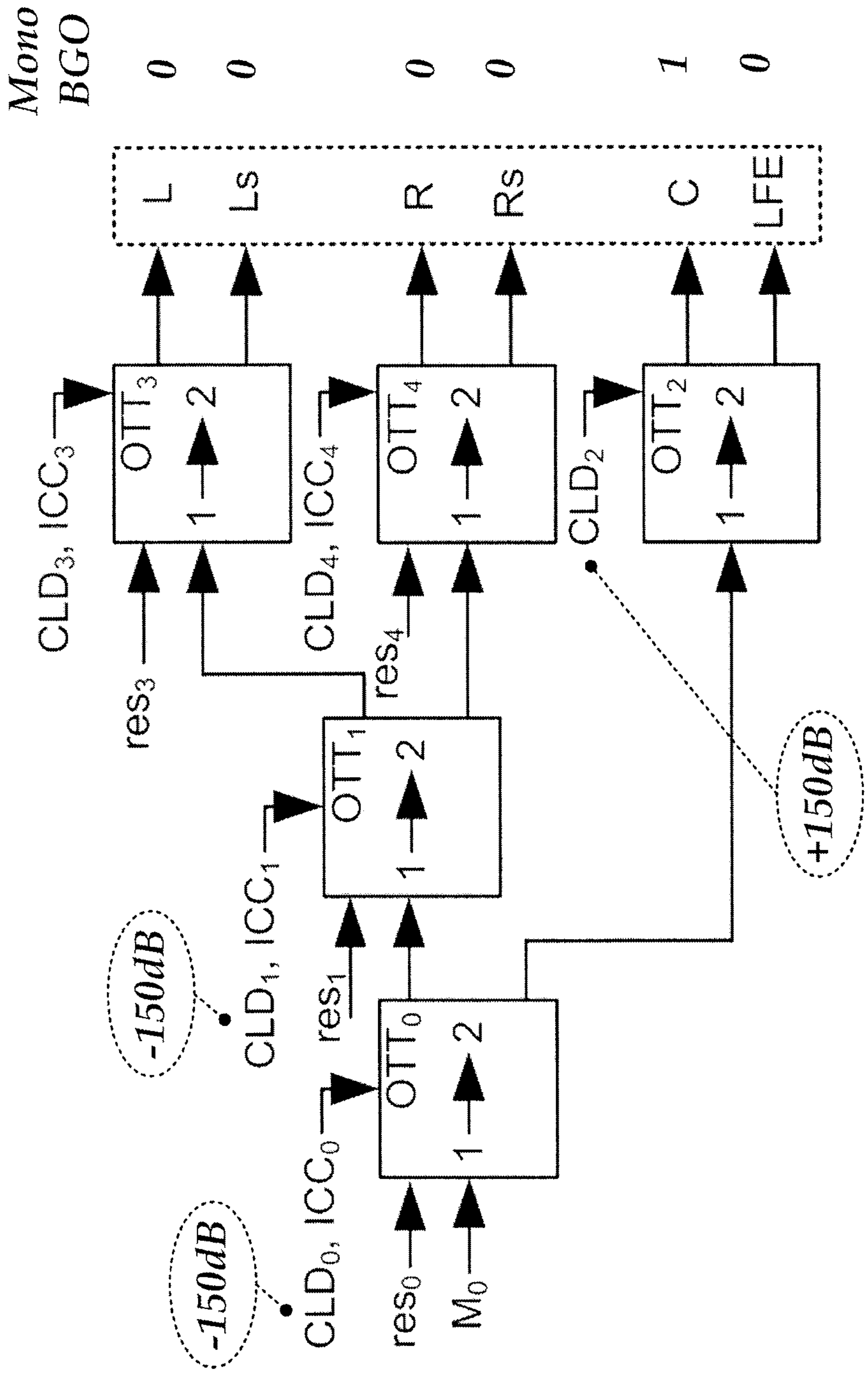
FIG. 10 is a diagram for explaining a concept of outputting a mono background object (BGO) signal based on 5-1-$5_2$ tree structure.

FIG. 9 is a diagram for explaining a concept of outputting a mono background object (BGO) signal based on 5-1-$5_1$ tree structure, and FIG. 10 is a diagram for explaining a concept of outputting a mono background object (BGO) signal based on 5-1-$5_2$ tree structure.

Referring to FIG. 9, 5-1-$5_1$ tree structure (first tree structure) for the multi-channel decoder 260B to upmix a mono input into 5.1 channels is provided. In order to map mono BGO $M_0$ by a center channel C in this 5-1-$5_1$ configuration, it is able to set up each channel dividing module OTT and an inter-channel level difference (CLD) corresponding to the channel dividing module OTT. For instance, by setting an inter-channel level difference $CLD_0$ corresponding to $OTT_0$ to a maximum value (+150 dB), all level of an input channel is made to be mapped by an upper signal (i.e., channel inputted to $OTT_1$) of two output signals of the $OTT_0$. By the similar principle, $CLD_1$ is set to −150 dB to be mapped by a lower output. If $CLD_4$ is set to +150 dB, all mono BGO can be automatically mapped by a center channel in the 5-1-$5_1$ tree structure. The rest of CLDs ($CLD_3$, $CLD_2$) can be set to arbitrary values, respectively.

FIG. 10 shows a 5-1-$5_2$ tree structure (second tree structure) for upmixing a mono input into 5.1 channels. By the same scheme of the 5-1-$5_1$ tree structure, it is able to set a channel level difference value. In particular, in order to output mono BGO to a center channel C, $CLD_0$ is set to −150 dB, $CLD_1$ is set to −150 dB, and $CLD_2$ is set to 150 dB. The rest of CLDs ($CLD_3$, $CLD_2$) can be set to arbitrary values, respectively.

Figure 11:
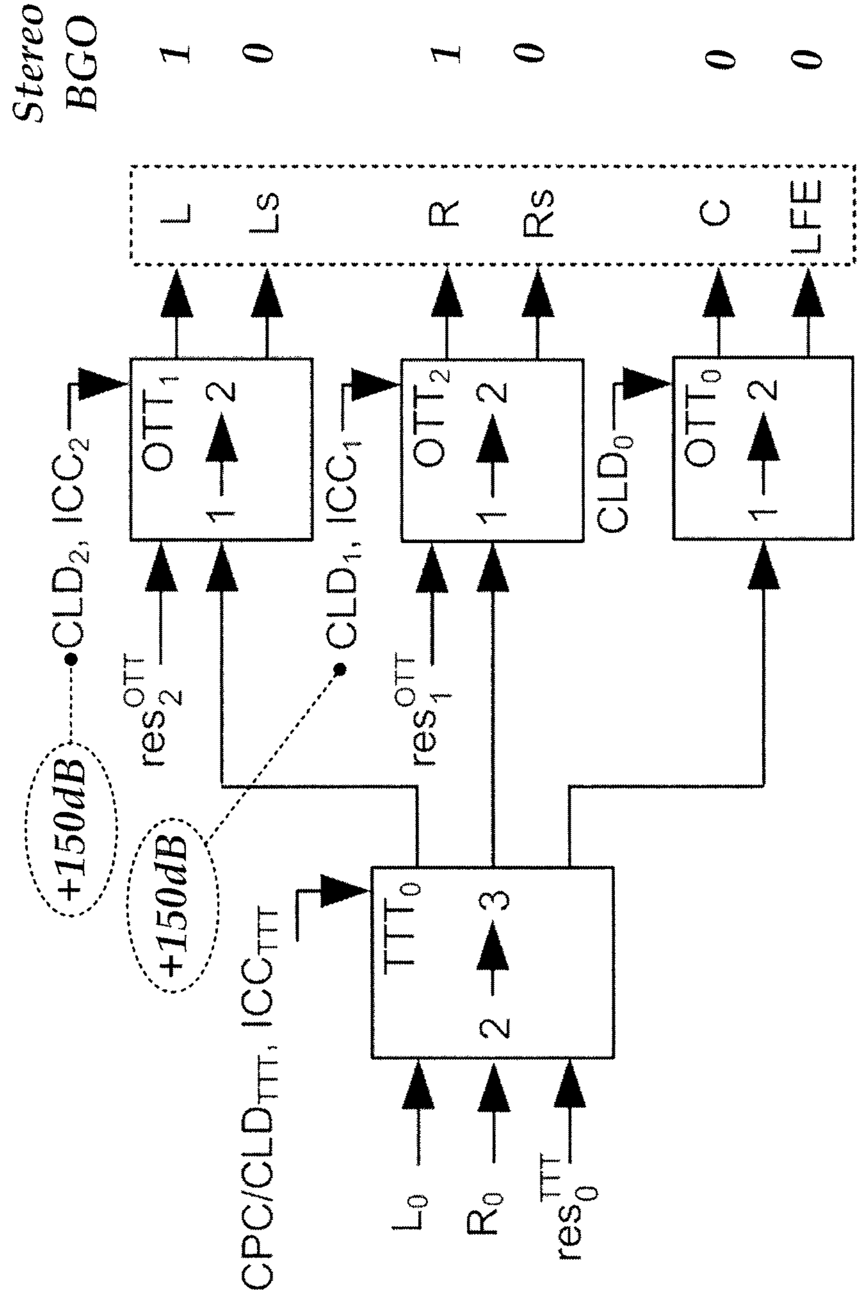
FIG. 11 is a diagram for explaining a concept of outputting a stereo background object (BGO) signal based on 5-2-5 tree structure.

FIG. 11 is a diagram for explaining a concept of outputting a stereo background object (BGO) signal based on 5-2-5 tree structure.

Referring to FIG. 11, a 5-3-5 configuration, which is the tree structure for upmixing a stereo input into 5.1 channels, is provided. TTT parameter of $TTT_0$ module can be determined to have an output of [L, R, 0]. By setting $CLD_2$ and $CLD_1$ to +150 dB each, $CLD_2$ and $CLD_1$ can be mapped by a left channel L and a right channel R, respectively. Since a signal at an insignificant level is inputted to $OTT_0$ only, $CLD_0$ can be set to an arbitrary value.

BGO Rendering According to User's Intention

First of all, in case of the automatic BGO rendering according to output mode, mono BGO is set to be automatically mapped by a center channel or stereo BGO is set to be automatically mapped by left and right channels. Yet, it is able to render mono/stereo BGO according to user's intention. In doing so, a user's control for the BGO rendering can be inputted as mix information (MXI).

For instance, mono BGO can be rendered at the same level for left and right channels under the control of a user. For this, in case of using the 5-1-$5_1$ tree structure shown in FIG. 9, $CLD_0$ is set to +150 dB, $CLD_1$ is set to +150 dB, and $CLD_3$ is set to 0. If mono BGO is outputted at the same level to 5.1 channels under the control of a user, $CLD_0$ to $CLD_4$ can be set to values ranging between −2~2 dB, respectively.

Generally, according to the above described scheme, an arbitrary CLD value can be set by the following formula according to user's intention.

$$CLD_k^{l,m} = 20\log\left\{\frac{m_{k,upper}^{l,m}}{m_{k,lower}^{l,m}}\right\} \quad \text{[Formula 1]}$$

In Formula 1, l indicates a time slot, m indicates a hybrid subband index, and k indicates an index of OTT box, ${m_{k,upper}}^{l,m}$ indicates the desired distribution amount to upper path, and ${m_{k,lower}}^{l,m}$ indicates the desired distribution amount to lower path.

Figure 12:
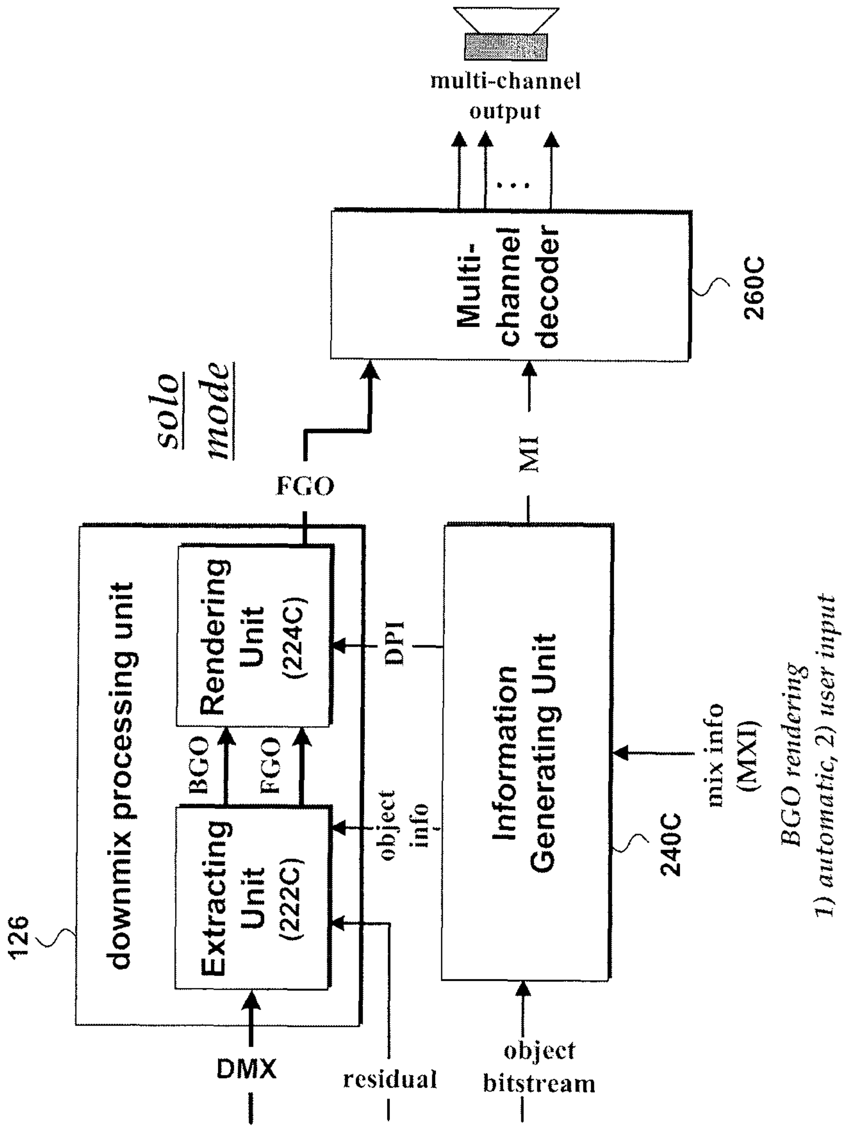
FIG. 12 is a block diagram for an example of a decoder for extracting a foreground object (FGO) signal in case of a solo mode.

FIG. 12 is a block diagram for an example of a decoder for extracting a foreground object (FGO) signal in case of a solo mode.

Referring to FIG. 12, a decoder 200C includes elements having the same names of the elements of the former decoder 300 shown in FIG. 3. The former decoder 200A.1/200A.2/200B shown in FIG. 6/7/8 is in a karaoke mode for outputting BGO. On the contrary, the decoder 200C corresponds to a solo mode (or a cappella mode) for outputting at least one FGO. In particular, a rendering unit 224C suppresses all background object BGO and outputs FGO only according to downmix processing information (DPI). If an output mode has at least three channels, a multi-channel decoder 260C is activated and an information generating unit 240C generates multi-channel information (MI) for upmixing of FGO.

In this case, how to map at least one FGO by multi-channels can be set using such a spatial parameter as CLD in the multi-channel information (MI). If one FGO is inputted to a multi-channel decoder 260C, a CLD value can be determined according to preset information or user's intention by the following formula.

$$CLD_k^{l,m} = 20\log\left\{\frac{m_{k,upper}^{l,m}}{m_{k,lower}^{l,m}}\right\}$$ [Formula 2]

In Formula 2, 1 indicates a time slot, m indicates a hybrid subband index, and k indicates an index of OTT box, $m_{k,upper}{}^{l,m}$ indicates the desired distribution amount to upper path, and $m_{k,lower}{}^{l,m}$ indicates the desired distribution amount to lower path.

In case of multi-FGO instead of single FGO, CLD can be determined by the following formula.

$$CLD_k^{l,m} = 10\log\left\{\frac{\sum_i \left(m_{i,k,upper}^{l,m} OLD_i^{l,m}\right)^2}{\sum_i \left(m_{i,k,lower}^{l,m} OLD_i^{l,m}\right)^2}\right\}$$ [Formula 3]

In Formula 3, 1 indicates a time slot, m indicates a hybrid subband index, and k indicates an index of OTT box, $m_{k,upper}{}^{l,m}$ indicates the desired distribution amount to upper path for an $i^{th}$ FGO, $m_{k,lower}{}^{l,m}$ indicates the desired distribution amount to lower path for an $i^{th}$ FGO, and $OLD_i$ indicates an object level difference for an $i^{th}$ FGO.

Figure 13:
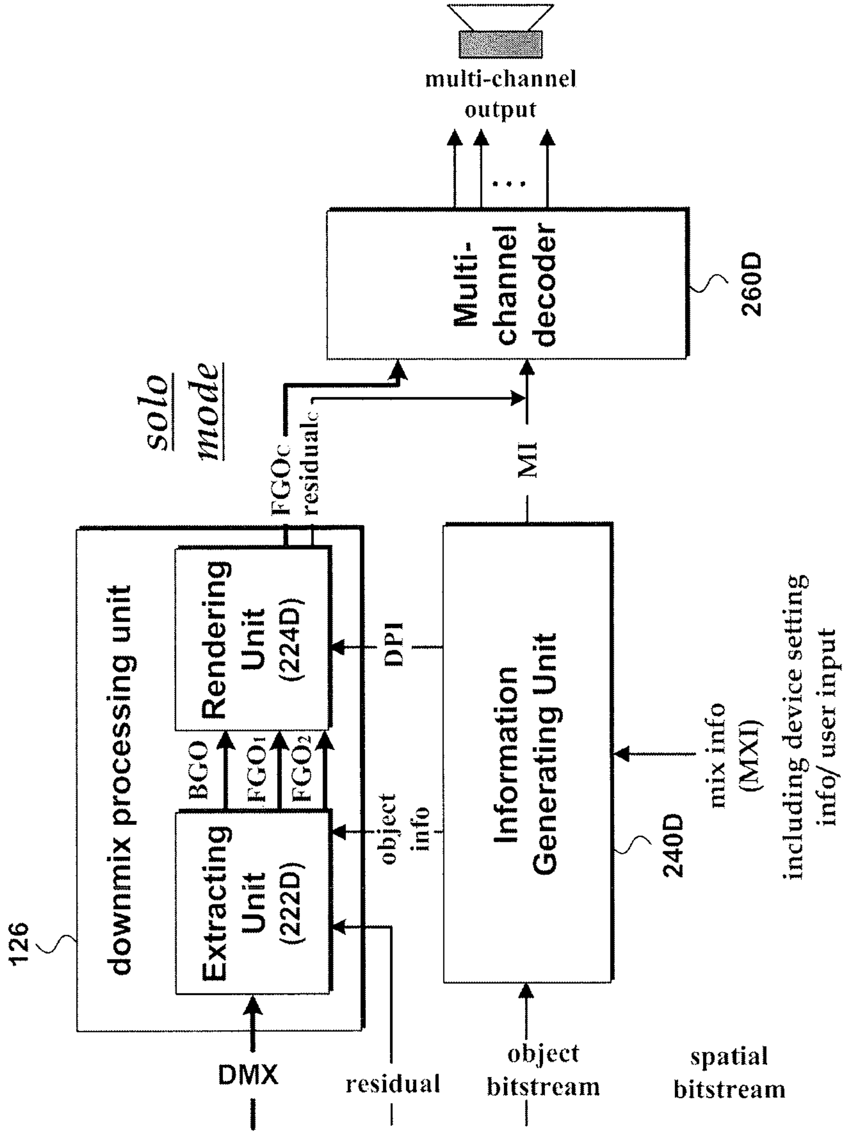
FIG. 13 is a block diagram for an example of a decoder for extracting at least two foreground object (FGO) signals in case of a solo mode.

FIG. 13 is a block diagram for an example of a decoder for extracting at least two foreground object (FGO) signals in case of a solo mode.

Referring to FIG. 13, a decoder 200D includes the elements having the same names of the elements of the former decoder 200 shown in FIG. 3 and performs functions similar to those of the former decoder 200 shown in FIG. 3. Yet, an extracting unit 222D extracts at least two FGOs from a downmix. In this case, the first FGO ($FGO_1$) and the second FGO ($FGO_2$) are completely reconstructed. Subsequently, a rendering unit 224D performs a solo mode, in which BGO is completely suppressed and at least two FGOs are outputted.

It is able to assume a case that the first FGO ($FGO_1$) and the second FGO ($FGO_2$) are mono and stereo, respectively. In case that a user renders the mono FGO ($FGO_1$) into a center channel of 5.1 channels and also renders the stereo FGO ($FGO_2$) into left and right channels of the 5.1 channels, a rendering unit 224D does not output FGO directly but a multi-channel decoder 260D is activated.

The rendering unit 224D generates a combined FGO ($FGO_C$) by combining at least two FGOs ($FGO_1$ and $FGO_2$) together. In this case, the combined FGO ($FGO_C$) can be generated by the following formula.

$$L=\mathrm{sum}(m_i{*}\mathrm{FGO}_i)$$

$$R=\mathrm{sum}(n_i{*}\mathrm{FGO}_i),$$ [Formula 4]

where $m_i$ and $n_i$ are mixing gains for $i^{th}$ FGO to be mixed into left and right channels, respectively.

The process for generating the combined FGO can be performed in a time domain or a subband domain.

In a process for generating the combined FGO through $OTT^{-1}$ or $TTT^{-1}$ module, a residual ($residual_C$) is extracted and then delivered to the multi-channel decoder 260D. This residual ($residual_C$) can be independently delivered to the multi-channel decoder 260D. Alternatively, the residual ($residual_C$) is encoded by an information generating unit 240D according to a scheme of multi-channel information (MI) bit stream and can be then delivered to the multi-channel decoder.

Subsequently, the multi-channel decoder 260D is able to completely reconstruct at least two FGOs ($FGO_1$ and $FGO_2$) from the combined FGO ($FGO_C$) using the residual ($residual_C$). Since the ITT (two-to-three) module of the related art multi-channel decoder is incomplete, the FGOs ($FGO_1$ and $FGO_2$) may not be completely separated from each other. Yet, the present invention prevents degrasion caused by the incomplete separation using the residual.

The audio signal processing apparatus according to the present invention is available for various products to use. Theses products can be mainly grouped into a stand alone group and a portable group. A TV, a monitor, a settop box and the like can be included in the stand alone group. And, a PMP, a mobile phone, a navigation system and the like can be included in the portable group.

Figure 14:
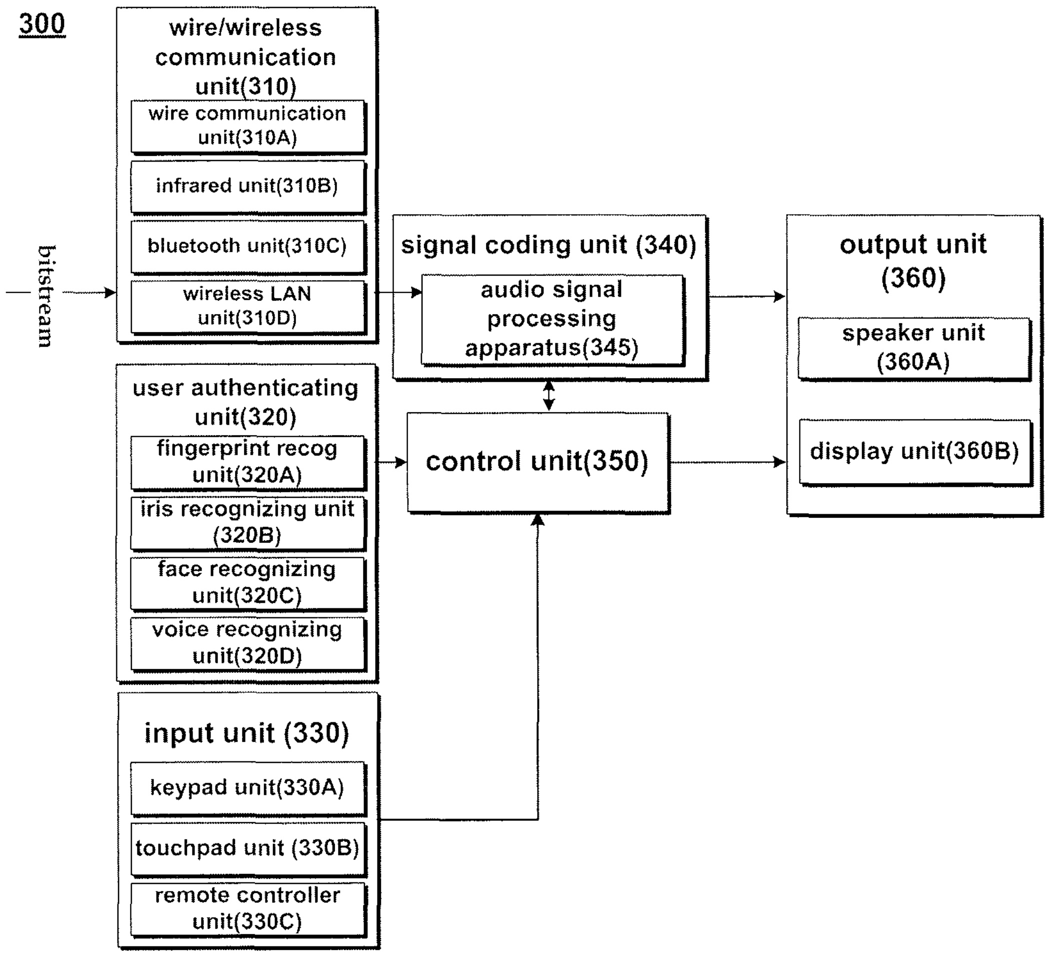
FIG. 14 is a schematic block diagram of a product in which an audio signal processing apparatus according to one embodiment of the present invention is implemented.

FIG. 14 is a schematic block diagram of a product in which an audio signal processing apparatus according to one embodiment of the present invention is implemented.

Referring to FIG. 14, a wire/wireless communication unit 510 receives a bitstream via wire/wireless communication system. In particular, the wire/wireless communication unit 310 can include at least one of a wire communication unit 310A, an infrared unit 310B, a Bluetooth unit 310C and a wireless LAN unit 310D.

A user authenticating unit 320 receives an input of user information and then performs user authentication. The user authenticating unit 320 can include at least one of a fingerprint recognizing unit 320A, an iris recognizing unit 320B, a face recognizing unit 320C and a voice recognizing unit 320D. The fingerprint recognizing unit 320A, the iris recognizing unit 320B, the face recognizing unit 320C and the speech recognizing unit 320D receive fingerprint information, iris information, face contour information and voice information and then convert them into user informations, respectively. Whether each of the user informations matches pre-registered user data is determined to perform the user authentication.

An input unit 330 is an input device enabling a user to input various kinds of commands and can include at least one of a keypad unit 330A, a touchpad unit 330B and a remote controller unit 330C, by which the present invention is non-limited.

A signal coding unit 340 performs encoding or decoding on an audio signal and/or a video signal, which is received via the wire/wireless communication unit 310, and then outputs an audio signal in time domain. The signal coding unit 340 includes an audio signal processing apparatus 345. As mentioned in the foregoing description, the audio signal processing apparatus 345 corresponds to the above-described embodiment (i.e., the encoder stage 100 and/or the decoder stage 200) of the present invention. Thus, the audio signal processing apparatus 345 and the signal coding unit including the same can be implemented by at least one or more processors.

A control unit 350 receives input signals from input devices and controls all processes of the signal decoding unit 340 and an output unit 360. In particular, the output unit 360 is an element configured to output an output signal generated by the signal decoding unit 340 and the like and can include a speaker unit 360A and a display unit 360B. If the output signal is an audio signal, it is outputted to a speaker. If the output signal is a video signal, it is outputted via a display.

Figure 15A:
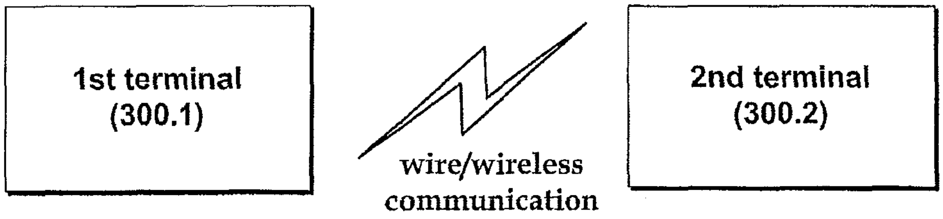
FIGS. 15(A) and 15 (B) are diagrams for explaining relations between products in which an audio signal processing apparatus according to one embodiment of the present invention is implemented.
Figure 15B:

FIGS. 15(A) and 15(B) are diagrams for explaining relations between products in which an audio signal processing apparatus according to one embodiment of the present invention is implemented. In particular, FIG. 15 shows the relation between a terminal and server corresponding to the products shown in FIG. 14.

Referring to FIG. 15 (A), it can be observed that a first terminal 300.1 and a second terminal 300.2 can exchange data or bit streams bi-directionally with each other via the wire/wireless communication units. Referring to FIG. 15 (B), it can be observed that a server 400 and a first terminal 300.1 can perform wire/wireless communication with each other.

An audio signal processing method according to the present invention can be implemented into a computer-executable program and can be stored in a computer-readable recording medium. And, multimedia data having a data structure of the present invention can be stored in the computer-readable recording medium. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, a bitstream generated by the above mentioned encoding method can be stored in the computer-readable recording medium or can be transmitted via wire/wireless communication network.

Accordingly, the embodiments of the present invention provide the following effects or advantages.

First of all, the present invention is able to control gain panning of an object without limitation.

Secondly, the present invention is able to control gain and panning of an object based on a selection made by a user.

Thirdly, in case that either vocal or background music is completely suppressed, the present invention is able to prevent a sound quality from being distorted according to gain adjustment.

Fourthly, in case that a mono or stereo signal is outputted, the present invention is able to adjust a gain of background music, thereby implementing a karaoke mode freely.

Accordingly, the present invention is applicable to processing and outputting an audio signal.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for processing an audio signal at an audio decoder, the method comprising:

receiving a downmix signal, a residual signal, and object information;

extracting a background-object signal and a foreground-object signal from the downmix signal using the residual signal and the object information;

receiving mix information including gain information for the background-object signal;

generating downmix processing information based on the object information and the mix information; and generating an output audio signal including a modified background-object signal and a modified foreground-object signal, wherein the modified background-object signal is obtained by modifying a gain of the background-object signal using the mix information, and wherein the modified foreground-object signal is obtained by modifying a gain of the foreground-object signal using the downmix processing information.

2. The method of claim 1, wherein the extracting of the background-object signal and the foreground-object signal from the downmix signal further includes using the object information to perform the extracting.

3. The method of claim 1, wherein the background-object signal corresponds to one of a mono signal and a stereo signal.

4. The method of claim 1, wherein the output audio signal corresponds to one of a mono signal and a stereo signal.

5. An audio decoder for processing an audio signal, the audio decoder comprising:

a multiplexer configured to receive a downmix signal, a residual signal, and object information;

an extracting unit configured to extract a background-object signal and a foreground-object signal from the downmix signal using the residual signal and the object information, wherein the object information includes information for recreation of object signals from the downmix signal;

an information generating unit configured to receive mix information including gain information for the background-object signal, and generate downmix processing information based on the object information and the mix information; and a rendering unit configured to generate an output audio signal including a modified background-object signal and a modified foreground-object signal, wherein the modified background-object signal is obtained by modifying a gain of the background-object signal using the nix information, and wherein the modified foreground-object signal is obtained by modifying a gain of the foreground-object signal using the downmix processing information.

6. The audio decoder of claim 5, wherein the background-object signal corresponds to one of a mono signal and a stereo signal.

7. The audio decoder of claim 5, wherein the output audio signal corresponds to one of a mono signal and a stereo signal.

8. A non-transitory computer-readable medium having instructions stored thereon, which, when executed by a processor, causes the processor to process an audio signal at an audio decoder, the computer-readable medium comprising:

the processor configured to perform the operations including:

receiving a downmix signal, a residual signal, and object information;

extracting a background-object signal and a foreground-object signal from the downmix signal using the residual signal and the object information;

receiving mix information including gain information for the background-object signal;

generating downmix processing information based on the object information and the mix information; and generating an output audio signal including a modified background-object signal and a modified foreground-object signal, wherein the modified background-object signal is obtained by modifying a gain of the background-object signal using the mix information, and wherein the modified foreground-object signal is obtained by modifying a gain of the foreground-object signal using the downmix processing information.

* * * * *